(12) United States Patent
Morini et al.

(10) Patent No.: US 7,015,170 B2
(45) Date of Patent: Mar. 21, 2006

(54) COMPONENTS AND CATALYSTS FOR THE POLYMERIZATION OF OLEFINS

(75) Inventors: Giampiero Morini, Padua (IT); Giulio Balbontin, Ferrara (IT); Yuri V. Gulevich, Ferrara (IT); Gianni Vitale, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 10/415,025

(22) PCT Filed: Sep. 4, 2002

(86) PCT No.: PCT/EP02/10049

§ 371 (c)(1),
(2), (4) Date: Apr. 24, 2003

(87) PCT Pub. No.: WO03/022894

PCT Pub. Date: Mar. 20, 2003

(65) Prior Publication Data

US 2004/0014595 A1    Jan. 22, 2004

(30) Foreign Application Priority Data

Sep. 13, 2001 (EP) .................................. 01203468

(51) Int. Cl.
*C08F 4/649* (2006.01)
(52) U.S. Cl. .................. 502/127; 526/124.9; 560/127; 560/128
(58) Field of Classification Search ............... 560/127, 560/128; 502/127; 526/124.9
See application file for complete search history.

(56) References Cited

U.S. PATENT DOCUMENTS

| 4,220,554 | A |   | 9/1980  | Scatáet al. ............... 252/429 B |
| 4,298,718 | A |   | 11/1981 | Mayr et al. .................. 526/125 |
| 4,399,054 | A |   | 8/1983  | Ferraris et al. ......... 252/429 B |
| 4,469,648 | A |   | 9/1984  | Ferraris et al. ................. 264/9 |
| 4,495,338 | A |   | 1/1985  | Mayr et al. .................. 526/125 |
| 4,990,479 | A | * | 2/1991  | Ishimaru et al. ............ 502/125 |
| 5,081,088 | A |   | 1/1992  | Koelle et al. ............... 502/107 |
| 5,436,213 | A |   | 7/1995  | Iiskola et al. ............... 502/115 |
| 6,469,112 | B1 | * | 10/2002 | Cheng et al. ............ 526/124.3 |

FOREIGN PATENT DOCUMENTS

| EP | 0045977  | 2/1982  |
| EP | 0395083  | 10/1990 |
| EP | 0553805  | 8/1993  |
| EP | 0553806  | 8/1993  |
| EP | 0601525  | 6/1994  |
| EP | 1061088  | 12/2000 |
| JP | 58138708 | 8/1983  |
| WO | 9844009  | 10/1998 |
| WO | 0216444  | 2/2002  |

* cited by examiner

Primary Examiner—Caixia Lu

(57) ABSTRACT

The present invention relates to a solid catalyst component for the polymerization of olefins $CH_2=CHR$ in which R is hydrogen or a hydrocarbon radical with 1–12 carbon atoms, comprising Mg, Ti, halogen and an electron donor selected from maleates of a particular formula. Said catalyst components when used in the polymerization of olefins, and in particular of propylene, are capable to give polymers in high yields and with high isotactic index expressed in terms of high xylene insolubility.

17 Claims, No Drawings

COMPONENTS AND CATALYSTS FOR THE POLYMERIZATION OF OLEFINS

The present invention relates to catalyst components for the polymerization of olefins, to the catalyst obtained therefrom and to the use of said catalysts in the polymerization of olefins $CH_2=CHR$ in which R is hydrogen or a hydrocarbyl radical with 1–12 carbon atoms. In particular the present invention relates to catalyst components, suitable for the stereospecific polymerization of olefins, comprising Ti, Mg, halogen and an electron donor compound selected from esters of specifically substituted maleic acids (substituted maleates). Said catalyst components when used in the polymerization of olefins, and in particular of propylene, are capable to give polymers in high yields and with good isotactic index expressed in terms of high xylene insolubility.

Non-substituted maleates and certain substituted maleates are known in the art and their use as electron donor compounds in the preparation of supported Ziegler-Natta catalyst components has already been disclosed.

EP-A-45977 discloses the use of non-substituted maleates as internal donors in catalyst components for the polymerization of olefins. The results obtained are poor both in terms of activity and stereospecificity. In U.S. Pat. No. 5,436,213 esters of maleic or fumaric acids substituted with a C1–C20 hydrocarbon group are generically mentioned. The specific disclosure is only directed to 2-methyl substituted maleates and in particular to diethyl 2-methylmaleate, diisobutyl 2-methylmaleate and didecyl 2-methylmaleate. The said specific maleates show only minor improvements with respect to the non-substituted maleates. As a whole however, the behaviour of the catalysts containing these donors is not satisfactory in particular in terms of activity.

The Japanese patent application 58(1983)-138708 discloses a process for the polymerization of olefins carried out in the presence of a catalyst one component of which contains magnesium, titanium, halogen and an electron donor that can also be an ester between a straight-chain alcohol and a substituted or unsubstituted maleic acid. The best performing catalysts, according to the said disclosure, would be those containing an ester of a C1–C4 alkyl monosubstituted maleic acid. However, the polymerization results reported in the said application show that also with the preferred donors the catalysts have performances that are not particularly attractive in terms of activity and stereospecificity. Considering what is disclosed in the art it would appear that Z-N supported catalyst components containing esters of maleic acids as internal donors would not be satisfactory in the polymerization of olefins and in particular of propylene.

It has been therefore very surprising to discover that certain specific substituted maleates, when used as internal donors, can give catalyst components showing a balance of properties in terms of activity and stereospecificity that renders them particularly suitable for the polymerization of olefins. Said catalysts in fact show activities and/or stereospecificity dramatically improved over the catalyst components containing the maleates of the prior art as internal donors.

Accordingly, the present invention regards a solid catalyst component for the polymerization of olefins $CH_2=CHR$ in which R is hydrogen or a hydrocarbon radical with 1–12 carbon atoms, comprising Mg, Ti, halogen and an electron donor selected from maleates of formula (I):

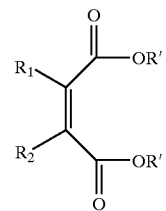

wherein R' is a C1–C20 hydrocarbon group optionally containing heteroatoms, $R_1$ is a C1–C20 hydrocarbon group optionally containing heteroatoms, and $R_2$ is H or a C1–C20 hydrocarbon group optionally containing heteroatoms, with the proviso that when $R_2$ is H, $R_1$ is isobutyl or a C5–C20 hydrocarbon group.

When $R_2$ is H, $R_1$ is preferably a primary alkyl group having from 5 to 10 carbon atoms or a cycloalkyl group. When both $R_1$ and $R_2$ are different from H they are preferably selected from C1–C20 alkyl groups.

The R' groups are preferably primary alkyl, arylalkyl or alkylaryl groups having from 2 to 10 carbon atoms. More preferably they are primary branched alkyl groups having from 2 to 8 carbon atoms. Examples of suitable R' groups are methyl, ethyl, n-propyl, n-butyl, isobutyl, neopentyl, 2-ethylhexyl and trifluoropropyl.

Specific examples of suitable maleates of formula (I) are: Diethyl 2-isobutylmaleate, Diisobutyl 2-isobutylmaleate, Di-n-butyl 2-isobutylmaleate, Bis(trifluoropropyl) 2-isobutylmaleate, Diethyl 2-n-pentylmaleate, Diisobutyl 2-n-pentylmaleate, Diethyl 2-cyclohexylmaleate, Diisobutyl 2-cyclohexylmaleate, Di-n-butyl 2-cyclohexylmaleate, Diethyl 2-n-decylmaleate, Diisobutyl 2-n-decylmaleate, Diethyl 2-cyclopentylmaleate, Diisobutyl 2-cyclopentylmaleate, Dimethyl 2-cyclopentylmaleate, Diethyl 2-n-decylmaleate Diethyl 2-cycloheptylmaleate, Diethyl 2-benzylmaleate, Diisobutyl 2-benzylmaleate Diethyl 2-cyclohexylmethylmaleate Diethyl 2-(2-ethylhexyl)maleate Diethyl 2-(1,3-dimethylbutyl)maleate Diethyl 2-(2-pentyl)maleate Diethyl 2-isopentylmaleate Diethyl 2-neopentylmaleate, Diethyl 2-(3-pentyl)maleate Diethyl 2-(cyano-ethyl)maleate Diethyl 2-(3,3,3-trifluoropropyl)maleate Diethyl 2-(3-amino-propyl) maleate Diethyl 2-(2,2,2-trifluoro-1-methylethyl)maleate, Diethyl 2,3-dimethylmaleate, Diethyl 2,3-diisobutylmaleate, Diisobutyl 2,3-diisobutylmaleate, Di-n-butyl 2,3-diisobutylmaleate, Bis(trifluoropropyl) 2,3-diisobutylmaleate, Diethyl 2,3-di-n-pentylmaleate, Diisobutyl 2,3-di-n-pentylmaleate, Diethyl 2,3-dicyclohexylmaleate, Diisobutyl 2,3-dicyclohexylmaleate, Di-n-butyl 2,3-dicyclohexylmaleate, Diethyl 2,3-di-n-decylmaleate, Diisobutyl 2,3-di-n-decylmaleate, Diethyl 2,3-dicyclopentylmaleate, Diisobutyl 2,3-dicyclopentylmaleate, Dimethyl 2,3-dicyclopentylmaleate, Diethyl 2,3-dicycloheptylmaleate Diethyl 2,3-disecbutylmaleate Diethyl 2,3-dibenzylmaleate, Diisobutyl 2,3-dibenzylmaleate Diethyl 2,3-dicyclohexylmethylmaleate Diethyl 2,3-bis(2-ethylhexyl)maleate Diethyl 2,3-bis(1,3-dimethylbutyl)maleate Diethyl 2,3-bis(2-pentyl)maleate Diethyl 2,3-diisopentylmaleate Diethyl 2,3-dineopentylmaleate, Diethyl 2,3-bis(3-pentyl)maleate, Diethyl 2,3-bis(cyano-ethyl)maleate Diethyl 2,3-bis(3,3,3-trifluoropropyl)maleate Diethyl 2,3-bis(2,2,2-trifluoro-1-methylethyl)maleate, Diethyl 2-isobutyl-3-methylmaleate, Diisobutyl 2-isobutyl-3-methylmaleate, Di-n-butyl 2-isobutyl-3-methylmaleate, Diethyl 2-n-pentyl-3-ethylmaleate, Diisobutyl 2-n-pentyl-3-n-butylmaleate, Diethyl 2-cyclohexyl-3-propylmaleate, Diisobutyl 2-cyclohexyl-3-isopropylmaleate, Di-n-butyl 2-cyclohexyl-3-secbutylmaleate.

As explained above, the catalyst components of the invention comprise, in addition to the above electron donors, Ti, Mg and halogen. In particular, the catalyst components comprise a titanium compound, having at least a Ti-halogen bond and the above mentioned electron donor compound supported on a Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are those containing at least one Ti-halogen bond. Preferably $TiCl_4$, $TiCl_3$ and Ti-haloalcoholates of formula $Ti(OR)_{n-y}X_y$, where n is the valence of titanium, X is halogen and y is a number between 1 and n, are used.

The preparation of the solid catalyst component can be carried out according to several methods. According to one of these methods, the magnesium dichloride in an anhydrous state and the maleates are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium-chloride in an anhydrous state, the titanium compound and the maleate is treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. which contains, in solution, a maleate of formula (I). The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ comprising the maleate of formula (I) in solution at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The maleate can be added during the treatment with $TiCl_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44009.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the maleate is added during one or more of these treatments.

In any of these preparation methods the desired maleate can be added as such or, in an alternative way, it can be obtained in situ by using an appropriate precursor capable to be transformed in the desired electron donor compound by means, for example, of known chemical reactions such as esterification, transesterification etc. Generally, the maleate is used in molar ratio with respect to the $MgCl_2$ of from 0.01 to 1 preferably from 0.05 to 0.5.

The solid catalyst components according to the present invention are converted into catalysts for the polymerization of olefins by reacting them with organoalumlinum compounds according to known methods.

In particular, it is an object of the present invention a catalyst for the polymerization of olefins $CH_2=CHR$, in which R is hydrogen or a hydrocarbyl radical with 1–12 carbon atoms, comprising the product of the reaction between:

(a) a solid catalyst component as described above;
(b) an alkylaluminum compound and, optionally,
(c) one or more electron-donor compounds (external donor).

The alkyl-Al compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of tiialkylaluminum's with alkylaluminum halides, alkylaluminum hydrides or alkylaluminum sesquichlorides such as AlEt$_2$Cl and Al$_2$Et$_3$Cl$_3$.

The external donor (c) can be of the same type or it can be different from the maleates of formula (I). Suitable external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers of the general formula (II):

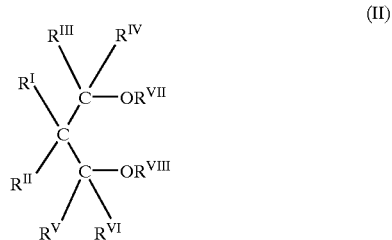

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, have the same meaning of $R^I$–$R^{VI}$ except that they cannot be hydrogen; one or more of the $R^I$–$R^{VIII}$ groups can be linked to form a cycle. Particularly preferred are the 1,3-diethers in which $R^{VII}$ and $R^{VIII}$ are selected from $C_1$–$C_4$ alkyl radicals.

Another class of preferred external donor compounds is that of silicon compounds of formula $R_a{}^5R_b{}^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, diisopropyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane. Moreover, are also preferred the silicon compounds in which a is 0, c is 3, $R^6$ is a branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (c) is used in such an amount to give a molar ratio between the organoaluminum compound and said electron donor compound (c) of from 0.1 to 500, preferably from 1 to 300 and more preferably from 3 to 100. As previously indicated, when used in the (co)polymerization of olefins, and in particular of propylene, the catalysts of the invention allow to obtain, with high yields, polymers having a high isotactic index (expressed by high xylene insolubility X.I.), thus showing an excellent balance of properties. This is particularly surprising in view of the fact that, as it can be seen from the comparative examples herebelow reported, the use as internal electron donors of the maleates of the prior art gives worse results in term of yields and/or xylene insolubility.

Therefore, it constitutes a further object of the present invention a process for the (co)polymerization of olefins $CH_2$=CHR, in which R is hydrogen or a hydrocarbyl radical with 1–12 carbon atoms, carried out in the presence of a catalyst as described above.

Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. Hydrogen or other compounds capable to act as chain transfer agents can be used to control the molecular weight of polymer.

The following examples are given in order to better illustrate the invention without limiting it.

Characterizations

Preparation of Maleates

The monosubstituted maleates according to formula (I) used in the present invention, can be prepared, for example, by reaction of diethyl acetylenedicarboxylate with the corresponding alkylmagnesium chloride in the presence of a Copper (I) complex.

As an example, the synthesis of diethyl 2-isobutyl maleate is reported herebelow.

A mechanically stirred suspension of copper(I) bromide-dimethylsulfide complex (20.4 g, 99.0 mmol) in 500 mL of THF was cooled to −40° C. and treated dropwise with 2.0 M solution of i-butylmagnesium chloride in THF (49.5 mL, 99.0 mmol) under an atmosphere of dry nitrogen. After stirring at −40° C. for 2 h, the reaction mixture was cooled to −78° C. and then treated dropwise with a solution of diethyl acetylenedicarboxylate (13.2 mL, 82.5 mmol) in 160 mL of THF. Upon completion of the addition, the mixture was stirred at −78° C. for 1 h, quenched with saturated NH$_4$Cl aq., then allowed to slowly warm up to room temperature, and stirred at this temperature for additional 30 min. The organic phase was separated and the water phase was thoroughly extracted with ether. The combined organic extracts were washed with saturated NH$_4$Cl aq., then with brine, dried over Na$_2$SO$_4$, and distilled in vacuum to give 14.8 g (79% yield, bp 74–75° C./1 mm Hg) of diethyl 2-1-butylmaleate as a colorless oil.

Propylene Polymerization: General Procedure

In a 4 liter autoclave, purged with nitrogen flow at 70° C. for one our, 75 ml of anhydrous hexane containing 800 mg of AlEt$_3$, 79.8 mg of dicyclopentyldimethoxysilane and 10 mg of solid catalyst component were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and, then, weighed and fractionated with o-xylene to determine the amount of the xylene insoluble (X.I.) fraction at 25° C.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

EXAMPLES

Examples 1–5 and Comparative Examples 1–3

Preparation of Solid Catalyst Components.

Into a 500 ml four-necked round flask, purged with nitrogen, 250 ml of $TiCl_4$ were introduced at 0° C. Then, were added under stirring 10.0 g of microspheroidal $MgCl_2 \cdot 2.8 C_2H_5OH$ (prepared according to the method described in ex.2 of U.S. Pat. No. 4,399,054 but operating at 3,000 rpm instead of 10,000) and an amount of maleate such as to give, with respect to Mg, a molar ratio of 6. The temperature was raised to 100° C. and maintained for 120 min. Then, the stirring was discontinued, the solid product was allowed to settle and the supernatant liquid was siphoned off.

250 ml of fresh $TiCl_4$ were added. The mixture was reacted at 120° C. for 60 min and, then, the supernatant liquid was siphoned off. The solid was washed six times with anhydrous hexane (6×100 ml) at 60° C. Finally, the solid was dried under vacuum and analyzed. The type and amount of maleate (wt %) and the amount of Ti (wt %) contained in the solid catalyst component are reported in table 1. Polymerization results are reported in table 2.

TABLE 1

| Example | Maleate Type | Wt % | Ti Wt % |
|---|---|---|---|
| 1 | Diethyl 2-isobutylmaleate | 8 | 3.2 |
| 2 | Diethyl 2-n-pentylmaleate | 10 | 2.8 |
| 3 | Diethyl 2-cyclohexylmaleate | 8.7 | 3.4 |
| 4 | Diethyl 2-n-decylmaleate | 6 | 3.7 |
| 5 | Diethyl 2-cyclopentylmaleate | 7.5 | 3.8 |
| Comp. 1 | Diethyl maleate | 10.4 | 5.4 |
| Comp. 2 | Diethyl 2-methylmaleate | 8.7 | 2.6 |
| Comp. 3 | Di-n-butyl maleate | 9.4 | 3.5 |

TABLE 2

| Example | Activity (Kg/g) | I.I. (%) |
|---|---|---|
| 1 | 45 | 97.2 |
| 2 | 41 | 97.2 |
| 3 | 54 | 97.4 |
| 4 | 43 | 97 |
| 5 | 38 | 96.5 |
| Comp. 1 | 16 | 93.9 |
| Comp. 2 | 26 | 96.6 |
| Comp. 3 | 26 | 96.4 |

The invention claimed is:

1. A solid catalyst component for the polymerization of olefins $CH_2=CHR$, in which R is hydrogen or a hydrocarbyl radical with 1–12 carbon atoms, comprising Mg, Ti, halogen and an electron donor selected from maleates of formula (I):

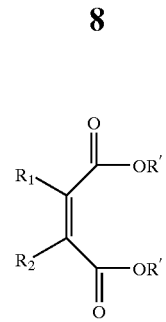

wherein R' is a C1–C20 hydrocarbon group, $R_1$ is isobutyl or a C5–C20 hydrocarbon group, and $R_2$ is H.

2. The solid catalyst component of claim 1 wherein $R_1$ is isobutyl, a primary alkyl group having from 5 to 10 carbon atoms or a cycloalkyl group.

3. The solid catalyst component according to claim 1 in which the R' groups are primary alkyl, arylalkyl or alkylaryl groups having from 2 to 10 carbon atoms.

4. The solid catalyst component according to claim 1 comprising a titanium compound having at least a Ti-halogen bond and the maleate supported on Mg dichloride.

5. The solid catalyst component according to claim 4 in which the titanium compound is $TiCl_4$ or $TiCl_3$.

6. The solid catalyst component according to claim 1 having a spherical form, a surface area (by B.E.T. method) between 20 and 500 $m^2/g$ and a total porosity (by B.E.T. method) higher than 0.2 $cm^3/g$.

7. A catalyst for the polymerization of olefins $CH_2=CHR$, in which R is hydrogen or a hydrocarbyl radical with 1–12 carbon atoms, comprising the product obtained by contacting:

(a) a solid catalyst component comprising Mg, Ti, halogen and an electron donor selected from maleates of formula (I):

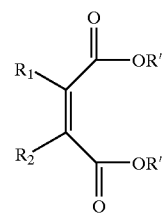

wherein R' is a C1–C20 hydrocarbon group, $R_1$ is isobutyl or a C5–C20 hydrocarbon group, and $R_2$ is H;

(b) an alkylaluminum compound and, optionally, (c) at least one electron-donor compound (external donor).

8. The catalyst according to claim 7 in which the alkylaluminum compound (b) is a trialkyl aluminum compound.

9. The catalyst according to claim 8 in which the trialkyl aluminum compound is selected from the group consisting of triethylaluminum, triisobutylaluminum, tri-n-butylaluminum, tri-n-hexylaluminum and tri-n-octylaluminum.

10. The catalyst according to claim 7 in which the external donor (c) is selected from the 1,3-diethers of the general formula (II):

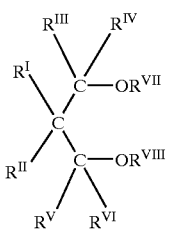

(II)

wherein $R^I$, $R^{II}$, $R^{III}$, $R^{IV}$, $R^V$ and $R^{VI}$ equal or different to each other, are hydrogen or hydrocarbon radicals having from 1 to 18 carbon atoms, and $R^{VII}$ and $R^{VIII}$, equal or different from each other, are hydrocarbon radicals having from 1 to 18 carbon atoms; one or more of the $R^I$–$R^{VIII}$ groups can be linked to form a cycle.

11. The catalyst according to claim 7 in which the external donor (c) is a silicon compound of formula $R_a^5R_b^6Si(OR^7)_c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms optionally containing heteroatoms.

12. The catalyst according to claim 11 in which a is 1, b is 1 and c is 2.

13. The catalyst according to claim 12 in which at least one of $R^5$ and $R^6$ are branched alkyl, cycloalkyl or aryl groups with 3–10 carbon atoms optionally containing heteroatoms and $R^7$ is a $C_1$–$C_{10}$ alkyl group.

14. The catalyst according to claim 11 in which a is 0, c is 3 and $R^6$ is a branched alkyl or cycloalkyl group and $R^7$ is methyl.

15. The catalyst according to claim 12 or 14 in which the silicon compound is selected from the group consisting of methylcyclohexyldimethoxysilane, diphenyldimethoxysilane, methyl-t-butyldimethoxysilane, dicyclopentyldimethoxysilane cyclohexyltrimethoxysilane, t-butyltrimethoxysilane, thexyltrimethoxysilane, 2-ethylpiperidinyl-2-t-butyldimethoxysilane and 1,1,1,trifluoropropyl-2-ethylpiperidinyl-dimethoxysilane.

16. The catalyst according to claim 13 wherein $R^7$ is methyl.

17. A process for the (co)polymerization of olefins $CH_2$=CHR, in which R is hydrogen or a hydrocarbyl radical with 1–12 carbon atoms, carried out in the presence of a catalyst comprising the product obtained by contacting:

(a) a solid catalyst component comprising Mg, Ti, halogen and an electron donor selected from maleates of formula (I):

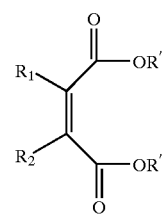

(I)

wherein R' is a C1–C20 hydrocarbon group, $R_1$ is isobutyl or a C5–C20 hydrocarbon group, and $R_2$ is H;

(b) an alkylaluminum compound and, optionally;

(c) at least one electron-donor compound (external donor).

* * * * *